Dec. 21, 1937.  E. RUMPLER  2,103,185

CRANKSHAFT

Filed Dec. 16, 1935

Inventor:

Patented Dec. 21, 1937

2,103,185

UNITED STATES PATENT OFFICE 2,103,185

CRANKSHAFT

Edmund Rumpler, Berlin-Charlottenburg, Germany

Application December 16, 1935, Serial No. 54,646
In Germany February 10, 1934

7 Claims. (Cl. 74—596)

This invention relates to a hollow crankshaft produced by casting for use in piston engines.

The invention proposes to produce a hollow crankshaft by casting which makes it possible to impart to this hollow body resembling a tube with several bends sufficient inherent stability and to manufacture it in a much simpler manner and at lower cost than a sheet metal crankshaft. Preferably, material of great strength is used which permits of being refined or hardened after casting by surface or through treatment.

The crank shaft together with crank bearing, crank pins and crank arms is made by casting in one single hollow body, the walls consisting throughout of homogeneous material possessing the same tensile properties and hardness.

The invention affords considerable advantages. The crankshaft consists of a single casting made in one operation at a much lower cost than a sheet metal crank shaft comprising two or more pieces. Compared with solid cast crankshafts, a saving in weight of approximately 50% or more is effected, which plays an important part in aircraft and vehicle motors and involves also a saving in material. Furthermore, the crankshaft throughout consists of homogeneous material possessing uniform tensile properties and hardness, and it can even be made lighter than sheet metal shafts by using walls differing in thickness according to the differences in stress to which it may be subjected so as to insure uniform specific material stress. If desired one or several ribs can be arranged between the walls differing in thickness for directly transmitting the forces appearing in the walls. The ribs can be provided parallel and/or vertically to the longitudinal axis of the shaft and, in the first instance, extend over the entire length of the shaft.

The invention provides for the first time a crankshaft having a stress bearing skin, constructed preferably as a body having uniform strength. This cast shaft with stress bearing skin makes it possible to render it hollow everywhere including the webs which hitherto were solid. Moreover, at the webs as well as at the bearings and pins the skin can be made so as to correspond to different stresses without extra work or finishing. Casting affords also the possibility of providing the inner ribs required for maintaining the form and rigidity of the stress bearing skin, which ribs serve further for properly guiding the forces at the bends.

Figure 1:
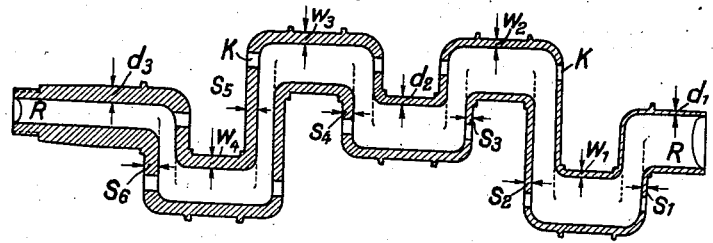
Figure 2:
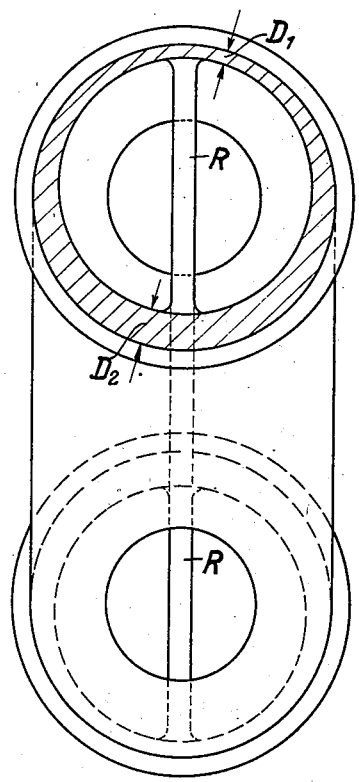

By way of example, the invention is illustrated in the accompanying drawing, in which Figure 1 is a longitudinal section of a cast hollow crankshaft; Fig. 2, a cross section of a bearing part on an enlarged scale; and Figs. 3 and 4 are sectional detail views.

Referring to the drawing, and first to Fig. 1, it will be noted that the wall thicknesses $d_1$, $d_2$, $d_3$ of the journals and the wall thicknesses $w_1$, $w_2$, $w_3$, $w_4$ of the crankshaft pins gradually increase towards the flywheel or working end, as do also the wall thicknesses of the crank arms $s_1$, $s_2$, $s_3$, $s_4$, $s_5$, $s_6$. In other words, the wall thickness increases with the external forces and momenta. The conical space thus produced serves also for reducing the weight. The external measurements being alike at the same spots in the construction shown, the hollow spaces or bores are decreasing of course. The construction shows also a rib R arranged symmetrically with respect to the longitudinal axis of the crankshaft and extending over the entire length thereof.

In the cross section of a bearing part of the shaft shown in Fig. 2 the hollow space is eccentrically disposed so as to produce a smaller wall thickness $D_1$ and a larger one $D_2$. This construction is chosen when the permissible stress of the casting material differs as to tension and compression. Fig. 2 further shows the symmetrically disposed rib R.

Figure 3:
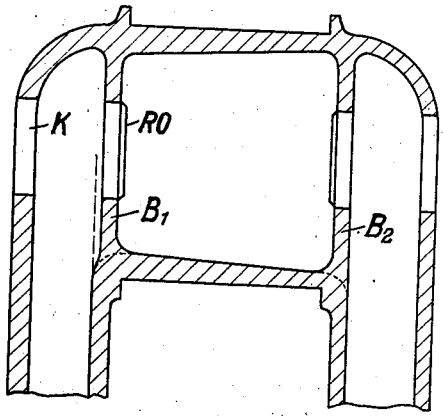
Figure 4:
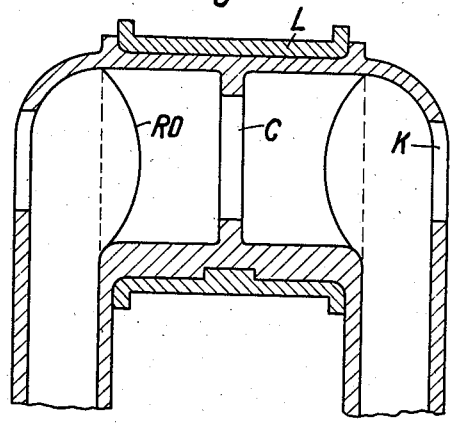

Fig. 3 shows in longitudinal section a tapering hollow space in a journal, with the larger wall thickness towards the working side.

Both Figs. 3 and 4 show inner ribs disposed vertically to the longitudinal axis of the crankshaft, Fig. 3 disclosing two lateral ribs $B_1$, $B_2$ and Fig. 4, a central rib C. Both figures further show short longitudinal ribs RO which give additional support.

According to Fig. 4, an undivided ring L of steel, bronze, etc., is provided at a journal, into which the crankshaft is cast and which is protected against rotation and displacement. The provision of such a ring or bush makes it possible to use for certain purposes good material of lesser strength including even aluminum alloys, such as dural, lautal, or an aluminum-magnesium alloy known under the trade-name "Electron." K designates holes for the proper and secure arrangement of the crank cores.

According to the invention, the thin-walled material of the stress bearing skin of the crankshaft can be refined accurately and to the exact extent desired from the inside or outside, or, simultaneously, from both inside and outside, which cannot be done with solid material. Refining or hardening can thus be carried out with much greater uniformity and within a shorter time.

The crankshaft according to the invention, in addition to being cooled on the outside, may be cooled also from within by forcing oil or air through it.

Another advantage of the invention is that the counterweights are much lighter, too.

I claim:—

1. A crankshaft for piston engines comprising an integral and hollow one-piece cast body, hollow crank bearings and crank pins and crank arms in said body integrally formed therewith, said hollow crank bearings, pins and arms forming at least one channel, free from permanent metallic cores including tubes, extending throughout said body and occupying the major portion of the cross section thereof.

2. A crankshaft for piston engines comprising an integral and hollow one-piece cast body adapted to form hollow crank bearings and hollow crank pins and hollow crank arms, said hollow crank bearings and pins and arms forming at least one channel, free from permanent metallic cores including tubes except for a longitudinal inner rib integrally cast with said body connecting the opposite wall portions of the shaft and directly transmitting the forces developed therein through the shortest distance, said channel extending throughout said body and occupying the major portion of the cross section thereof.

3. A crankshaft for piston engines comprising an integral and hollow one-piece cast body adapted to form hollow crank bearings and hollow crank pins and hollow crank arms, said hollow crank bearings and pins and arms forming at least one channel, free from permanent metallic cores including tubes except for at least one inner rib disposed vertically to the longitudinal axis of said body and integrally cast therewith, said channel extending throughout said body and occupying the major portion of the cross section thereof.

4. A crankshaft for piston engines comprising an integral and hollow one piece cast body adapted to form hollow crank bearings and hollow crank pins and hollow crank arms, said hollow crank bearings, pins and arms forming at least one channel, free from permanent metallic cores including tubes, extending throughout said body and occupying the major portion of the cross section thereof, said cast body having walls the thickness of which gradually decreases from one end of the shaft to the other in accordance with the decrease of the forces to be transmitted whereby uniform distribution of the stresses throughout the crankshaft is obtained.

5. A crankshaft for piston engines comprising an integral and hollow one-piece cast body adapted to form hollow crank bearings and hollow crank pins and hollow crank arms, said body being constituted of a material having different compressional and tensional strength, and said hollow crank bearings, pins and arms forming at least one channel, free from permanent metallic cores including tubes, extending throughout said cast body and occupying the major portion of the cross section thereof, said channel being eccentrically arranged in the bearings and pins.

6. A crankshaft for piston engines comprising an integral and hollow one-piece cast body adapted to form hollow crank bearings and hollow crank pins and hollow crank arms, said hollow crank bearings, pins and arms forming at least one channel, free from permanent metallic cores including tubes, extending throughout said body and occupying the major portion of the cross section thereof, said body being constituted of a light metal alloy.

7. A crankshaft for piston engines comprising an integral and hollow one-piece cast body adapted to form hollow crank bearings and hollow crank pins and hollow crank arms and being constituted of a relatively soft alloy, said hollow crank bearings, pins and arms forming at least one channel, free from permanent metallic cores including tubes, extending throughout said body and occupying the major portion of the cross section thereof.

EDMUND RUMPLER.